Sept. 11, 1962  S. B. STEINCAMP  3,053,320
FLUID INJECTION APPARATUS WELLS
Filed March 28, 1960

INVENTOR
S. B. STEINCAMP
BY J. H. McCarthy
HIS AGENT

United States Patent Office 3,053,320
Patented Sept. 11, 1962

3,053,320
FLUID INJECTION APPARATUS WELLS
Sammy Ben Steincamp, Quitman, Tex., assignor to Shell Oil Company, New York, N.Y., a corporation of Delaware
Filed Mar. 28, 1960, Ser. No. 17,803
3 Claims. (Cl. 166—68)

This invention relates to chemical feeding apparatus and automatic control means therefor, and pertains more particularly to apparatus for pumping measured quantities of liquid having chemically active properties down the casing of an oil or gas well to prevent or mitigate hydrate formation, emulsion formation, or the corrosion of the equipment located in the well.

In many oil fields, the nature of the fluid or fluids in the producing formation is such that it is necessary to add to the fluid some material or chemical substance which beneficially affects the fluid and/or counteracts certain deleterious properties which may be possessed by the fluid. For example, in many oil fields the production fluid is corrosive by nature so that the well casing, production tubing and other production equipment are rapidly corroded, thus necessitating frequent replacement.

In other cases, formation waters in the well may combine with certain hydrocarbons in the production fluid to form hydrates which are undesirable in that they tend to clog or reduce the throughput of the production equipment. In other fields, formation waters often mix with oil within a well to form emulsions which must be broken in order to separate the oil therefrom before piping it to storage tanks.

While emulsified oil and water may be separated by various means and methods at the surface of the well, it is often desirable to break an emulsion, or prevent its formation, within the well substantially adjacent to the producing zone by introducing into the well a suitable demulsifying agent. Likewise, to prevent the formational hydrates within a well, it is desirable to introduce similarly a hydrate inhibitor or a hydrate agent. In a like manner, a corrosion inhibitor may be introduced into a well wherein it becomes mixed with the production fluid and is produced therewith to form a protective layer or film on the production equipment.

In a normal low pressure or pumping well, the corrosion inhibitor, emulsifier or dehydrating agent, either undiluted or dissolved in a suitable solvent or suspended in a suitable fluid, is normally fed down the annulus of a well between the well casing and the production tubing, thus becoming commingled with the fluid in a well and being pumped or flowed from the well therewith. At present, various methods are employed for introducing a chemical reagent into a well where it becomes commingled with the well fluid. Most of the present known methods possess certain undesirable features in that they are inaccurate in the amount of chemical being injected, time consuming with regard to the time needed for the operating personnel to inject the chemical into the well, inefficient in that the chemical at times is not completely flushed down the well casing, and expensive from the standpoint of the amount of additional equipment which must be employed to inject the chemical into the well.

It is therefore a primary object of the present invention to provide apparatus for automatically injecting a chemical reagent into a pumping well.

A further object of this invention is to provide an automatic chemical injection system for wells which accurately measures out a predetermined amount of chemical, injects it into the well casing of a well, and then flushes it down the well.

Another object of this invention is to provide an automatic chemical injection system for wells whereby a predetermined amount of chemical may be added to and flushed down a well casing without any of the flushing liquid coming in contact with the interior of the apparatus, thereby eliminating any chance of the injection system becoming clogged by materials, such as paraffin, which may be produced along with the well fluid.

These and other objects of this invention will be understood from the following description taken with reference to the attached drawing, wherein.

Figure 1:
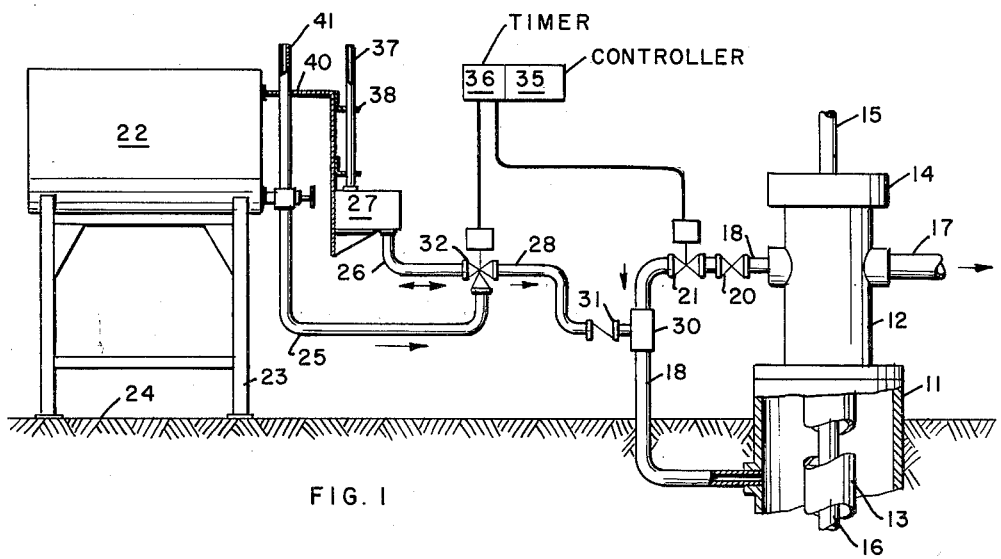
FIGURE 1 is a schematic view diagrammatically showing the present system positioned adjacent a well which may be produced by means of a reciprocating pump.

Referring to FIGURE 1 of the drawing, a typical well installation is illustrated as comprising a well casing 11 which is cemented in a borehole, the upper end of the casing being closed by a wellhead assembly 12 or any other suitable closure means. A production tubing string 13 is suspended within the casing 11 in a manner well known to the art. The production tubing string 13 extends downwardly into the casing to a position near the bottom of the well where a pump (not shown) is secured to the lower end of the tubing string 13. The top of the tubing string 13, or the top of the wellhead assembly 12, is closed in a conventional manner, as by a stuffing box 14 which surrounds a polished rod 15 mounted for vertical reciprocation through the stuffing box 14. The polished rod 15 is coupled to a string of sucker rods 16 which is positioned within the tubing string 13 and extends downwardly to the bottom of the well where it actuates the plunger of a pump.

The wellhead assembly 12 is shown as being provided with a production flowline 17 for conveying production fluid from the well to a separator, tank or other pipeline. A bypass conduit 18 is shown as being connected to the well casing on the outside thereof, the top of the conduit 18 being in communication with the top of the production tubing string 13 while the lower end of the conduit 18 is in communication with the interior of the well casing 11 outside the production tubing 13. The bypass conduit 18 may be provided with a manually-operated valve 20 and a power-operated valve 21 for controlling flow therethrough. Valve 21 is normally closed.

The chemical injection system of the present invention comprises a well-treating fluid or chemical storage tank 22 which may be positioned on legs 23 on the ground 24 adjacent the well. The storage tank 22 is connected by means of conduits 25 and 26 to a measuring tank 27. The measuring tank 27 in turn is connected through conduits 26 and 28 to a T connection 30 in the bypass conduit 18, in communication between the top of the production tubing 13 and the well casing 11. A check valve 31 is preferably provided in conduit 28 next to the pipe T 30 so as to prevent fluid entering conduit 28 from the bypass conduit 18.

Suitable valve means are employed in the conduits leading to and from the measuring tank 27 so that the flow to the measuring tank 27 can be stopped when the measuring tank 27 is being drained. Thus, a valve in each line may be employed, or, as illustrated, a three-way valve 32 may be employed with conduits 25, 26 and 28 being connected to the three-way valve 32 in a manner such that fluid flows from conduit 25 into conduit 26 in one position of the valve, and from conduit 26 to conduit 28 in the other position of the valve.

Figure 2:
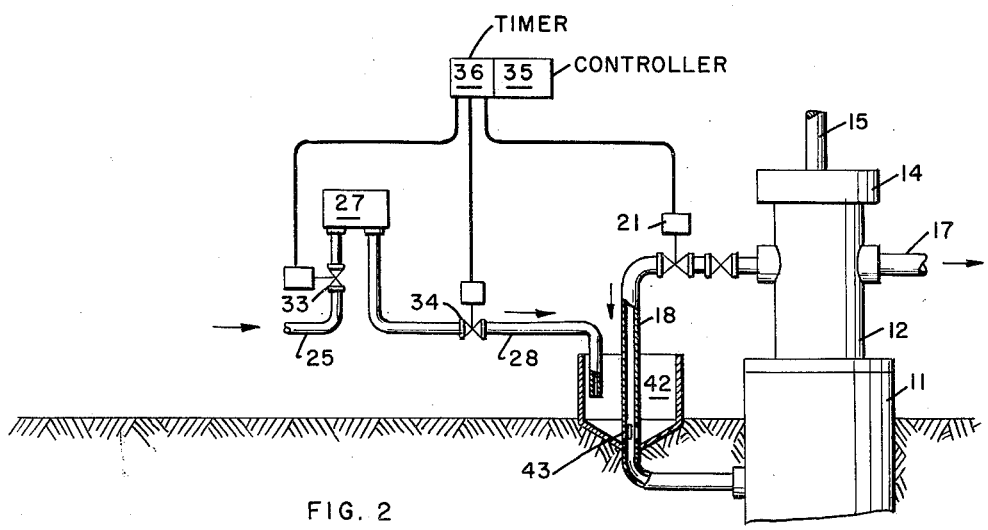
FIGURE 2 is a diagrammatic view showing a modification of the apparatus of FIGURE 1 which may be employed on wells which are not under pressure and wherein the casing-tubing annulus is normally at or open to atmospheric pressure; and, FIGURE 3 is a view taken in longitudinal cross-section of a venturi-type injector.

Alternatively, as shown in FIGURE 2 of the drawing the measuring tank 27 may be directly connected to the filling conduit 25 while each of the conduits 25 and 26 may be equipped with individually operated control valves 33 and 34.

Valves 21, 33 and 34, as well as the three-way valve 32, are preferably of the electrically-actuated type but may be gas or air-operated, such as a diaphragm valve where gas pressure is available. The valves 21 and 32 of FIGURE 1, and the valves 21, 33 and 34 of FIGURE 2, are operatively connected to a suitable controller or control circuit 35 which is adapted to be actuated by the closing of a time-responsive device 36, such as an electric, gas, or spring-driven clock mechanism of any desired type. It may be seen that the time interval between repeated actuation of the valves by the controller 35 may be set as desired by adjusting the time-responsive device 36.

As illustrated in FIGURE 1, measuring tank 27 is preferably positioned below the storage tank 22 so that liquid will feed from the storage tank 22 to the measuring tank 27 by gravity when valve 32 is open so as to put conduit 25 in communication with conduit 26. Extending upwardly from the top of the measuring tank 27 is a venting standpipe 37 which is open at all times and extends to a level above the top of the storage tank 22. The venting standpipe 37 may be made of a piece of a small diameter, say 1/8 of an inch, tubing which may be made of any suitable material ranging from stainless steel to plastic. In the event that a transparent plastic standpipe 37 is employed, it may also serve as a gauge for the storage tank 22. In some cases, small diameter plastic tubing is so flexible that it requires supporting clamps 38 to maintain it in an upright position. The clamps 38 are fixedly secured to any suitable type of mounting bracket 40 extending upwardly from the measuring tank 27, by which the measuring tank 27 may be hung from the chemical storage tank 22. In the event that the venting standpipe 37 is made of metal, an additional glass gauge 41 may be vertically positioned at the end of the storage tank 22 in order to observe the level of the liquid therein.

Figure 3:
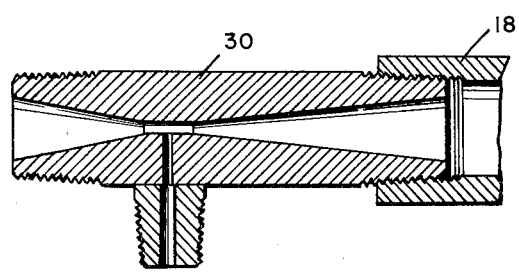

If desired, the pipe T 30 of FIGURE 1 may contain therein a venturi oriffce, as shown in FIGURE 3, whereby circulation of well fluid through the bypass conduit 18 will tend to pull any well treating chemical out of conduit 28. In the arrangement shown in FIGURE 2 for a well having an open tubing-casing annulus, chemical from the measuring tank 27 may be run through conduit 28 into a chamber 42 surrounding the bypass conduit which is provided with one or more drain openings 43 within the chamber 42.

In operation, the measuring tank 27 is full of a treating fluid at all times since the valve 32 is normally set to allow fluid to flow from the storage tank 22 through conduits 25 and 26 and into the measuring tank 27. The apparatus is designed to inject automatically a liquid chemical into the casing-tubing well annulus and circulate the chemical down the well casing to the bottom of the well tubing where a bottom hole pump forces it up the tubing as it produces fluid from the well. At regular time intervals, say every 8 hours or every 24 hours, the timer 36 of FIGURE 1 energizes the control circuit so as to open valve 21 in the bypass conduit 18 and change the setting of valve 32 so as to close off conduit 25 and put 26 in communication with conduit 28. Thus, chemical fluid in the measuring tank then flows through conduits 26, 28, check vale 31 and into the bypass conduit 18 through T 30. With valve 21 open, at least a portion of a production fluid coming up the production tubing 13 is diverted through bypass 18 so that it pulls the liquid chemical out of conduit 28 and flushes it down the well. At the same time none of the well liquid comes in contact with the chemical injection apparatus or the small diameter conduits thereof in a manner which would tend to clog or contaminate them with various sediments often produced from a well. Thus, it may be seen that the present automatic injection system comprises an inexpensive and efficient apparatus by which predetermined batches, say one or two quarts, of a chemical treating agent may be measured and then flushed batchwise down a well casing to combat corrosion, hydrate formation or emulsification within the well.

Although the present invention has been described with regard to a well being produced by means of a reciprocating pump and having a sucker rod string 16 and a polished rod 15 positioned within the well, it is to be realized that the present invention could also be employed in wells produced by means of natural formation pressure.

I claim as my invention:

1. Apparatus for introducing batches of a well-treating liquid into a producing well having a well casing with a production tubing string positioned therein, said apparatus comprising a well-treating fluid storage tank, a measuring tank positioned at a level below said storage tank, open venting standpipe means extending from said measuring tank to at least level with the top of said storage tank, bypass conduit means outside said well casing in communication between said production tubing string and the interior of said well casing, first conduit means in communication between said storage tank and said measuring tank, second conduit means in communication between said measuring tank and the bypass conduit means, valve means in said first and second conduit means for alternately opening one of said conduit means while closing the other of said conduit means, and valve means in said bypass conduit means openable to permit circulation of flow from the production string through the bypass conduit and into the well casing to direct well treating fluid entering the bypass conduit from the second conduit means into and down the well casing.

2. Apparatus for introducing batches of a well-treating liquid into a producing well having a well casing with a production tubing string positioned therein, said apparatus comprising a well-treating fluid storage tank, a measuring tank positioned at a level below said storage tank, open venting standpipe means extending from said measuring tank to at least level with the top of said storage tank, bypass conduit means outside said well casing in communication between said production tubing string and the interior of said well casing, first conduit means in communication between said storage tank and said measuring tank, second conduit means in communication between said measuring tank and said bypass conduit means outside said well casing, power-operated valve means in said first and second conduit means for alternately opening one of said conduit means while closing the other of said conduit means, power-operated valve means in said bypass conduit means upstream of the connection of said bypass conduit means with said second conduit means for releasing at least a portion of the flow from said production tubing string through said bypass conduit and into the well casing to circulate any well-treating fluid in said bypass conduit means down the well casing, and time-operated circuit means for periodically actuating all of said valve means in coordination to direct the flow of well fluid through said bypass conduit means and into the well casing together with well-treating fluid from said second conduit means.

3. Apparatus for introducing batches of a well-treating liquid into a producing well having a well casing with a production tubing string positioned therein, said apparatus comprising a well-treating fluid storage tank, a measuring tank positioned at a level below said storage tank, open venting standpipe means extending from said measuring tank to at least level with the top of said storage tank, first conduit means in communication between said storage tank and said measuring tank, a power-operated three-way valve in said first conduit means, bypass conduit means outside said well casing in communication between said production tubing string and the interior of said well casing, power-operated valve means in said bypass conduit means, second conduit means in communication between said measuring tank said three-way valve and said bypass conduit means when the three-day valve is open, and time-operated circuit means operatively connected to said three-way valve and said valve means in said bypass conduit means for periodically opening said valve means and opening said three-way valve to direct the flow of fluid from said measuring tank to said well casing while circulating well fluid from said tubing string into said well casing.

References Cited in the file of this patent
UNITED STATES PATENTS

| | | |
|---|---|---|
| 2,163,436 | Raymond et al. | June 20, 1939 |
| 2,773,551 | Warden et al. | Dec. 11, 1956 |
| 2,815,078 | Reynolds | Dec. 3, 1957 |
| 2,884,067 | Marken | Apr. 28, 1959 |